(12) United States Patent  
Gidron et al.

(10) Patent No.: US 8,031,694 B2  
(45) Date of Patent: Oct. 4, 2011

(54) SYSTEM AND METHOD FOR FORMATTING DATA FOR A MOBILE COMMUNICATION DEVICE AND TRANSMITTING THE DATA TO THE MOBILE COMMUNICATION DEVICE

(75) Inventors: Yoad Gidron, Yokneam (IL); Rafael Ton, Yokneam (IL)

(73) Assignee: Amdocs Software Systems Limited, Dublin (IE)

( * ) Notice: Subject to any disclaimer, the term of this patent is extended or adjusted under 35 U.S.C. 154(b) by 876 days.

(21) Appl. No.: 12/068,573

(22) Filed: Feb. 8, 2008

(65) Prior Publication Data

US 2009/0201908 A1    Aug. 13, 2009

(51) Int. Cl.  
*H04J 3/06* (2006.01)

(52) U.S. Cl. ........ 370/350; 370/503; 370/300; 370/520; 370/100; 370/512; 370/476; 370/507; 455/414.4; 455/432.1; 455/502; 455/51.1

(58) Field of Classification Search .................. 370/350, 370/503, 507, 512, 520, 100.1, 300, 476; 455/414.4, 432.1, 502, 51.1  
See application file for complete search history.

(56) References Cited

U.S. PATENT DOCUMENTS

| | | | |
|---|---|---|---|
| 6,636,873 B1 * | 10/2003 | Carini et al. ........................ 1/1 |
| 2003/0046434 A1 * | 3/2003 | Flanagin et al. .............. 709/248 |
| 2005/0005259 A1 * | 1/2005 | Avery et al. ................... 717/103 |
| 2007/0245223 A1 * | 10/2007 | Siedzik et al. ............. 715/500.1 |
| 2008/0195691 A1 * | 8/2008 | Kloba et al. ................. 709/201 |
| 2009/0125802 A1 * | 5/2009 | Chen et al. ................... 715/234 |

* cited by examiner

*Primary Examiner* — Jeffrey Pwu  
*Assistant Examiner* — Abdelnabi Musa  
(74) *Attorney, Agent, or Firm* — Zilka-Zotab, PC

(57) ABSTRACT

A system and method for flexible data provision to mobile communication devices, which enables the user to selectively download data to the mobile communication device from a remote computer. The selective data download may optionally apply to one or more of a single item of data, to multiple items of data, one or more categories of data and the like. Preferably, the user interface provided through the remote computer comprises a mark-up language document, such as a Web page for example.

35 Claims, 3 Drawing Sheets

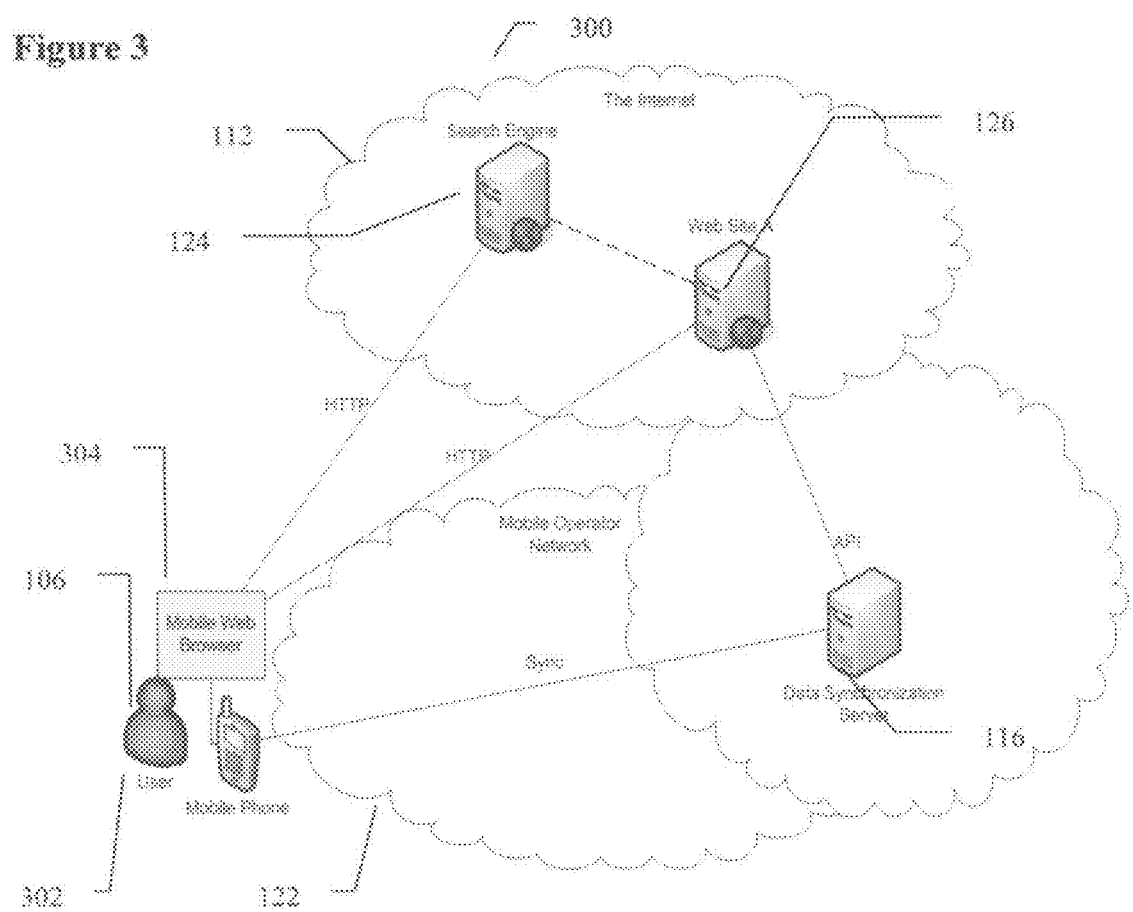

SYSTEM AND METHOD FOR FORMATTING DATA FOR A MOBILE COMMUNICATION DEVICE AND TRANSMITTING THE DATA TO THE MOBILE COMMUNICATION DEVICE

FIELD OF THE INVENTION

The present invention is of a system and method for flexible data retrieval for mobile communication devices, and in particular, to such a system and method in which such data retrieval is performed through a server or computer.

BACKGROUND OF THE INVENTION

Digitally enabled telephones and other connected devices, including cellular telephones, so called "smart phones", Java enabled phones and VoIP telephones (telephones which communicate through the "Voice over IP" protocol, also known as Internet telephones) are all able to communicate with a server. Unlike simple analog telephones, this ability to communicate with a server increases the variety and type of services which may be offered through such telephones. For example, one type of service which may be offered is the ability to synchronize data with a server.

In order to support such synchronization, various protocols and standards are known, including the Open Mobile Alliance Data Synchronization (OMA DS) protocol. This standard, which is also known as SyncML (its former name), defines a protocol for a platform-independent information synchronization. SyncML is most commonly thought of as a method to synchronize contact and calendar information (PIM) between some type of handheld device and a computer (personal, or network-based service), such as between a mobile phone and a personal computer or a server.

However, such synchronization is typically pre-set and predetermined according to one or more functions available on the server or personal computer. It does not permit any type of flexible functionality; for example, it does not permit the user to seek new types of information and to add this new information to the digitally enabled telephone, quickly and easily.

Furthermore, existing solutions offer protocols and software for downloading data and/or other content to a mobile communication device. Data retrieval is different, as is downloading content to mobile communication devices. The latter requires special advance pre-processing and production to be ready to download and currently cannot be done "on the fly" or "spontaneously".

SUMMARY OF THE INVENTION

There is thus an unmet need for, and it would be highly useful to have, a system and method for flexible data provision to mobile communication devices, which enables the user to selectively download data to the mobile communication device from a remote computer. There is also an unmet need for, and it would be highly useful to have, such a system and method in which data is selected for downloading through a mark-up language document, such as for example a Web page.

The present invention overcomes these drawbacks of the background art by providing a method and a system for flexible data provision to mobile communication devices, which enables the user to selectively download data to the mobile communication device from a remote computer. The selective data download may optionally apply to one or more of a single item of data, to multiple items of data, one or more categories of data and the like. Preferably, the user interface provided through the remote computer comprises a mark-up language document, such as a Web page for example.

By "mobile communication device" it is meant any portable device, such as a cellular telephone, PDA or other computer having voice communication capabilities, or any digital device featuring a data processor and voice communication capabilities through any type of communication network, whether a voice communication network, a data communication network or a computer network, according to any protocol, whether a voice communication protocol, a data communication protocol or any other suitable protocol.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "mobile communication device" on a "network", featuring a "server" and preferably for cellular communication, it should be noted that optionally any device featuring a data processor and/or the ability to execute one or more instructions with the ability to support at least voice communication may be described as a mobile communication device, including but not limited to any type of telephone enabled computer, a cellular telephone, an IP telephone (software (virtual) device or real (hardware) device), a smart phone, a PDA (personal digital assistant), or a pager. Any two or more of such devices in communication with each other, and/or any computer in communication with a mobile communication device, may optionally comprise a "network", which may (for example) optionally be a computer network and/or a cellular network.

A "server" as termed herein may optionally comprise any computer that is connected to a fixed-line IP network. It should be noted that optionally any device featuring a data processor and/or the ability to execute one or more instructions may be described as a computer, including but not limited to a PC (personal computer), a server, a minicomputer. Any two or more of such devices in communication with each other, and/or any computer in communication with any other computer, may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a schematic block diagram of another exemplary system according to the present invention wherein the mobile communication device comprises the web/WAP browser.

DESCRIPTION OF THE PREFERRED EMBODIMENTS

Figure 1:
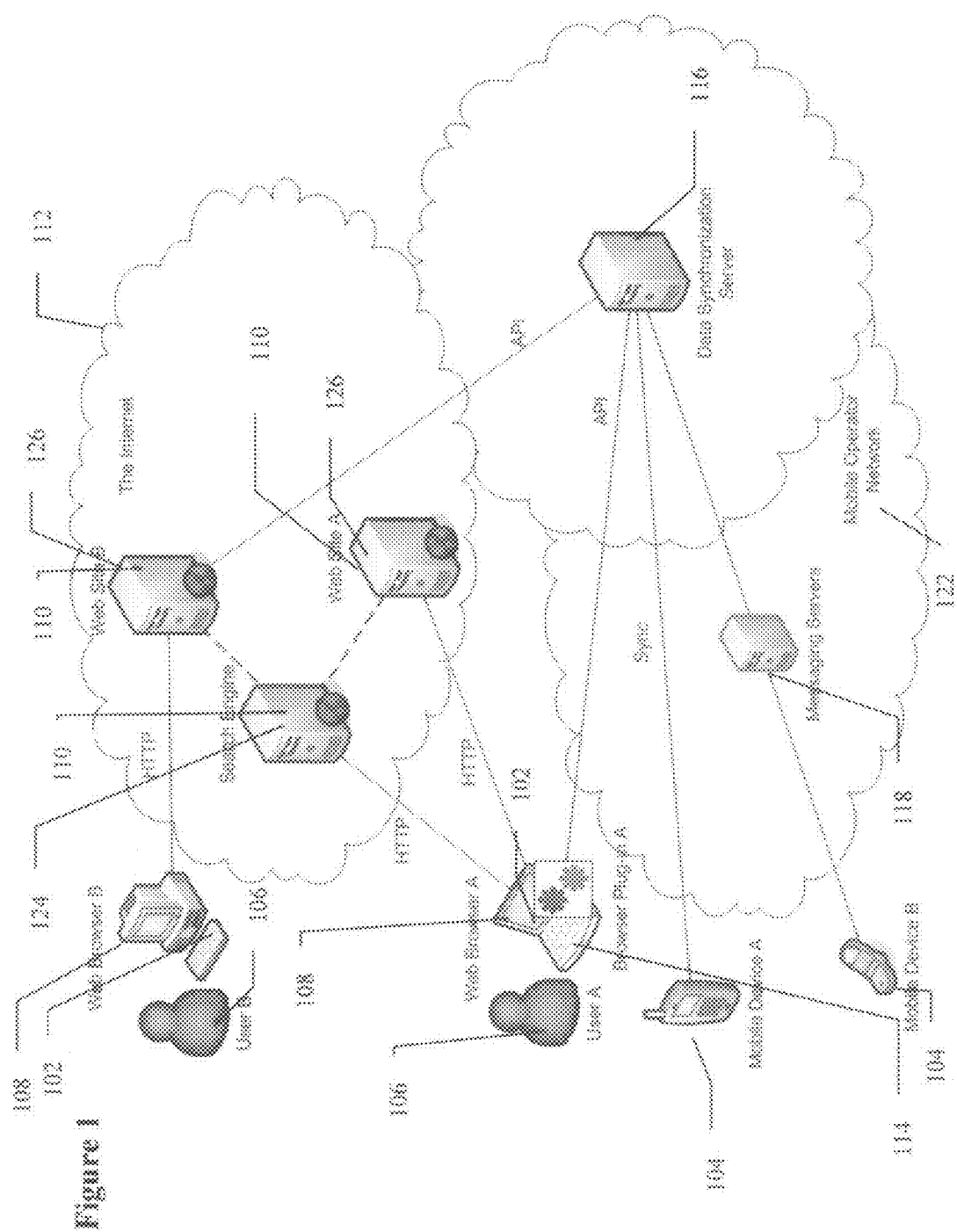
FIG. 1 is a schematic block diagram of an exemplary system according to the present invention.

The present invention is of a system and method for flexible data provision to mobile communication devices, which enables the user to selectively download data to the mobile communication device from a remote computer. The selective data download may optionally apply to one or more of a single item of data, to multiple items of data, one or more categories of data and the like. Preferably, the user interface provided through the remote computer comprises a mark-up language document, such as a Web page for example.

Preferably, the user is able to download any type of data, including but not limited to, events, contacts, notes, meetings, pictures, text from a standard Web page provided by the remote computer to the mobile communication device of the user. The data is optionally and preferably retrieved with either a local plug-in (integrated with a standard Web browser) or through one or more special links that are added to dynamically-generated Web pages. By "plug-in" it is meant any software, software component, code instructions, firmware and the like which is capable of communicating with and optionally integrating into a Web browser. A plug-in may optionally be determined according to any compatible technology, including but not limited to ActiveX® for Microsoft Internet Explorer or NPAPI for Mozilla based browsers such as FireFox for example. A server component adapts the data into one or more suitable data formats which can be rendered by a mobile communication device.

Optionally and preferably, for the embodiment with a Web browser plug-in, preferably the plug-in analyzes Web pages or other mark-up language documents, more preferably in real time or "on the fly", and extracts information and/or content (including but not limited to one or more of contacts, pictures, notes, events) from the displayed data. The extracted information is then preferably transferred to the server component.

The server side component then preferably converts the information into a suitable mobile data structure, including but not limited to vCard, vCalendar, vNote, XML (eXtensible Markup Language), Nokia Smart Messaging, EMS (Enhanced Message Service), MMS (Multimedia Messaging Service), WAP Push (in which a link is sent to the mobile communication device, after which data pull-down is performed from the linked resource); or a combination thereof (for example, vCard, vCalendar, vNote by MMS or WAP Push, or through a non-data format method such as sending a vCard by SMS), or any other data format which can be stored and rendered in the mobile communication device. Nokia Smart Messaging is a protocol for providing content and configuration to a mobile communication device over the signaling channel of a mobile network. The message includes one or more functions but is sent as a text message with special prefixes and codes which enable the mobile communication device to recognize it as being functional rather than text based.

The server component then preferably either pushes the data to the mobile communication device or sends a trigger to the device to retrieve the information from the server. Optionally, the mobile communication device may "pull" the data from the server without such a trigger being sent (in the next scheduled synchronization).

According to some embodiments of the present invention, the remote computer may optionally be in communication with a computer of the user and/or with the mobile communication device of the user directly. The remote computer may optionally be in communication with a computer of the user and/or with the mobile communication device through any type of network, including but not limited to the Internet or local corporate portals (Intranets). Optionally, the mobile communication device may provide a web/WAP browser for displaying mark-up language documents.

According to optional embodiments of the present invention, the system comprises a mobile data management component, including but not limited to a Mobile Data Synchronization server to employ synchronization protocols in order to provide the data to the mobile communication device. The focus of communication between the mobile communication device and the synchronization server is preferably to enable the latter server to provide information in a suitable format to the mobile communication device.

Optionally, a Messaging Server may be used to deliver the information, for example through sending a text or multimedia message that contains the data.

According to other optional embodiments of the present invention, the system comprises an advertisement component to add relevant advertisements to the data which is downloaded to the mobile communication device.

According to still other optional embodiments of the present invention, the system comprises an indexing component which extracts, manages and updates mobile information separately, as described in further details below. Briefly, the indexing component preferably indexes and scans Web sites or other types of mark-up language documents in an offline manner, extracting data, which includes but is not limited to contacts, pictures, notes and events and formats. The extracted data is then preferably transcoded, converted or otherwise adapted to one or more formats supported by mobile communication devices.

According to still other optional embodiments of the present invention, the system comprises a Data Management server which manages the subscriber's mobile data.

Without wishing to be limited in any way, the present invention may optionally be used for a number of applications that enable users to more easily and flexibly download data from a remote computer to a mobile communication device. For example, with regard to the Internet as a non-limiting, illustrative example only, users may wish to effectively transfer information from a Web page to their mobile devices so that it will be instantly available, anywhere. A few non-limiting, illustrative examples of the utility of such transfer are as follows. A user looks for a restaurant through a database or on a remote computer or through a computer network, and upon locating the restaurant, wishes to push the address, phone number and name of the restaurant to the mobile communication device such as a cellular telephone for example.

As another example, a user looks for a company and contact information on the Internet, and upon locating the desired information, wishes to update the mobile communication device, such as a cellular telephone for example, with the telephone number and name that was found.

As yet another example, a user is browsing the Internet and wants to send a Web page link with notes to the mobile communication device, such as a cellular telephone for example, for future reference.

As still another example, a user is searching for a picture on the Internet and wants to send the located image to the mobile communication device, such as a cellular telephone for example.

Of course many other different examples could optionally be provided; the above are intended to be illustrative only of at least some capabilities of the present invention, without any limitation intended or implied.

The principles and operation of the present invention may be better understood with reference to the drawings and the accompanying description.

Referring now to the drawings, FIG. 1 is a schematic block diagram of an exemplary system according to the present invention. Any symbols or images used therein are not intended to be limiting in any way. As shown, a system 100 preferably features a plurality of user computers 102 and a plurality of mobile communication devices 104, controlled by a plurality of users 106. For the sake of illustration only and without any intention of being limiting in any way, two user computers 102, two mobile communication devices 104 and two users 106 are shown, labeled "A" and "B" for clarity.

Each user computer 102 preferably operates a web browser 108 and/or other type of mark-up language document interface. User computer 102 preferably communicates with a remote computer 110 through a computer network 112 as shown; for the purpose of illustration only and without any intention of being limiting, computer network 112 is described with regard to the Internet. Also a plurality of remote computers 110 are shown, again for the purpose of illustration only and without any intention of being limiting.

Again for the sake of illustration and without intending to be limiting in any way, user computer 102A preferably features a browser plug-in 114, which is software or code associated with web browser 108A. Browser plug-in 114 preferably communicates, through computer network 112, with a synchronization server 116. Synchronization server 116 also preferably communicates with mobile communication devices 104A and B as shown, for providing data to mobile communication devices 104. As described in greater detail below, such data provision may optionally be made through "push" or "pull" mechanisms.

With regard to the general operation of synchronization server 116 with mobile communication devices 104, preferably synchronization server 116 receives one or more commands and/or instructions with one or more associated data items. Synchronization server 116 then preferably parses and/or formats and/or interprets and/or converts the one or more data items into a format and/or data structure which is suitable for the recipient mobile communication device(s) 104. More preferably, synchronization server 116 parses the one or more data items, for example dividing the data into a plurality of relevant portions which are then converted to an appropriate format. For example, for a meeting at a particular location on a particular date, such portions may optionally include but are not limited to vCard for receiving contact information, MMS for providing map and driving directions, vNote for user comments and vCalendar for date and time information. For other types of media, such as for example audio data, video data and the like, optionally and preferably synchronization server 116 performs transcoding, based on the capabilities of the mobile communication device. Optionally, synchronization server 116 first examines the data format, and then if necessary, performs any format changes.

For some types of information, particularly if the information is received from browser plug-in 114, the user 106 is preferably requested to indicate a category into which the information is to be placed, more preferably with the assistance of a "wizard" or other assistive software interface (not shown). For example, if contact information is provided, the user 106 preferably indicates that this information is to be provided to mobile communication device 104 as contact information. Otherwise, optionally browser plug-in 114 could perform an automatic analysis of the information, to determine whether it may be categorized. For example, if the information includes a number, browser plug-in 114 could optionally consider whether it is a telephone number. In any case, browser plug-in 114 preferably causes (whether automatically or manually) the information to be divided to one or more fields; also optionally and preferably, user 106 is asked whether such a division is suitable before downloading the information.

Synchronization server 116 then provides the one or more data items to the appropriate mobile communication device (s) 104. The information may optionally be sent according to any suitable data synchronization protocol, including but not limited to the standard SyncML protocol or the proprietary mSync protocol. The latter is described in U.S. Provisional Application No. 61/006,352, entitled "SYSTEM AND METHOD FOR CLIENT SYNCHRONIZATION FOR A COMMUNICATION DEVICE" by the present inventors, filed on Jan. 8 2008, hereby incorporated by reference as if fully set forth herein. However, the exact synchronization protocol is not important as any suitable protocol may be used. The information may optionally be sent indirectly through another server, including but not limited to a messaging server 118 as shown. Messaging server 118 may optionally communicate with mobile communication device 104 according to any messaging protocol, including but not limited to EMS, MMS, SMS or WAP Push as previously described.

Synchronization server 116 may optionally operate according to the Open Mobile Alliance Data Synchronization (OMA DS) protocol. This standard, which is also known as SyncML (its former name), defines a protocol for a platform-independent information synchronization. SyncML is most commonly thought of as a method to synchronize contact and calendar information (PIM) between some type of handheld device and a computer (personal, or network-based service), such as between a mobile phone and a computer or a server. However, for this embodiment of the present invention, the standard may optionally be used as a communication protocol for communicating one or more (preferably parsed) data items to mobile communication device 104.

Synchronization server 116 may optionally receive information regarding one or more functional parameters of mobile communication device 104, preferably regarding functional capabilities of mobile communication device 104. Such functional parameters may optionally be received and assessed according to the model of mobile communication device 104. The determination of the model also provides an indication of the software capabilities of mobile communication device 104; for example, the content types and media formats that are supported by mobile communication device 104, such as JPEG and GIF for images, 3GP for video, etc. Optionally, mobile communication device 104 may only be able to display text, or alternatively may also be able to display one or more of images, audio data and/or video data. Also optionally, mobile communication device 104 may feature or lack a calendar, notes function and the like. Other options include determining whether MMS or other advanced messaging types may be received by mobile communication device 104.

Synchronization server 116 may optionally receive the information in the form of a string, such as the User-Agent string, as is well known for any HTTP-based protocol in the art, in order to identify the type of device for (or exemplified by) mobile communication device 104. Once the type of device has been identified, it can be mapped to a device profile, which includes all the relevant capabilities, such as supported content types, protocols, screen size, and so forth.

Alternatively, UAProf (User Agent Profile) is a standard method, well known in the art, for retrieving device capabilities for wireless devices. UAProf files are based upon XML; they describe the capabilities of a wireless device, including vendor, model, multimedia capabilities (if any), the size of the screen, character set(s) that are supported, and in some cases also provide advanced information regarding the ability to handle video data and so forth. The vendor of the wireless device and/or the mobile service provider may optionally provide such files, which can then optionally be used by synchronization server 116 to determine a device profile for mobile communication device 104. This approach may also optionally be combined with the above approach in order to determine a device profile.

The information received by synchronization server 116 is preferably used by synchronization server 116 to adjust the format of the data sent to mobile communication device 104, such that synchronization server 116 optionally and more preferably adjusts the format of the data "on the fly" according to the requirements of mobile communication device 104. Most preferably, mobile communication device 104 and synchronization server 116 perform a "handshake" or other bi-directional communication in order for synchronization server 116 to receive the necessary parameters from mobile communication device 104 at the time of the data request for downloading; alternatively or additionally, synchronization server 116 may receive such information in advance (or not in "real time"), for example from mobile communication device 104 associated with a particular subscriber and/or carrier providing this service.

Synchronization server 116 may optionally be combined with messaging server 118. Communication with any of synchronization server 116 and/or messaging server 118 and mobile communication device 104 is preferably performed through a wireless network 122 with a service provider and/or operator of a mobile network (not shown). Messaging server 118 may optionally be implemented as and/or comprise a SMSC (short message service center), MMSC (Multimedia Messaging Service Center), PPG (Push Proxy Gateway) for WAP (wireless application protocol) Push, EMSC (email service center), or any other gateway with a combination of messaging types. Wireless network 122 may optionally be implemented as any wireless or cellular network, including but not limited to WiFi, WiMAX and/or a cellular telephone network. The structural components of such a network are not shown as they are easily understood by one of ordinary skill in the art.

As a non-limiting, illustrative example, suppose that user 106A searches through computer network 112 (in this example the Internet) using remote computer 110, in this example a Search Engine 124, for a restaurant. The results are displayed using Web Browser 108A which has browser plug-in 114A installed. When the results are displayed, user 106A chooses a restaurant. Browser plug-in 114A preferably examines the web site and HTML code (and/or other underlying mark-up language code, such as XML for example) and extracts the contact information, name, telephone numbers etc from the HTML code. User 106A is given a choice to add the information to mobile communication device 104. When User 106A requests adding the data to mobile communication device 104A, browser plug-in 114A preferably structures the data (optionally and more preferably with data format detection and any necessary reformatting) and sends it to synchronization server 116. Synchronization server 116 then preferably parses the data into relevant portions as previously described. These data structures are sent to the mobile communication device 104A using mobile data protocols such as MMS, SyncML and updated in various locations within mobile communication device 104A; depending on the data format and protocol, the data can be stored in the inbox, address book, calendar, file system (internal device memory or external memory such as a memory card for example) and the like.

User 106A may also optionally and preferably set expiration or validity time to the data entered in order not to keep unnecessary data in mobile communication device 104A. Upon expiration of the data, the data is deleted from mobile communication device 104A.

If mobile communication device 104A has a specific synchronization client installed, the data may be sent from synchronization server 116 to mobile communication device 104A using a synchronization protocol as described above. Otherwise, synchronization server 116 may optionally send the information as previously described.

Turning now to user computer 102B, as shown Web browser 108B does not feature browser plug-in 114 as previously described. Instead, user computer 102B communicates with a remote computer 110, shown as a plurality of web servers 126A and B. Remote computer 110 provides mark-up language data to Web browser 108B of user computer 102B, for example to display a Web page. However, rather than extracting the data of interest through browser plug-in 114, instead web server 126 preferably communicates directly with synchronization server 116, by notifying synchronization server 116 of the information to be communicated. Web server 126 preferably provides a hyperlink, for example through highlighted text or a GUI gadget, or other indicator (optionally and more preferably involving embedded mark-up language code, such as embedded HTML, Javascript, JAVA and/or ActiveX code), which a user (such as user 106B) can click on or otherwise select with a mouse or other pointing device. Upon such a selection, web server 126 communicates the relevant data to synchronization server 116, for example optionally through an API (application programming interface) that is exposed or provided by synchronization server 116. The data parsing and further transmission processes preferably occur as previously described.

Each of web servers 126A and B may optionally extract information to be provided to mobile communication devices 104. The extracted data, for example from web pages or other types of mark-up language documents, preferably includes but is not limited to contacts, pictures, notes, audio data, video data, image data, textual data, events and formats. The extracted data is then preferably transcoded, converted or otherwise adapted to one or more formats supported by mobile communication devices 104, for example as previously described, and is preferably then sent to synchronization server 116, more preferably for assisting with the above described process in which web server 126 communicates the relevant data to synchronization server 116. Alternatively, the extracted data is optionally not transcoded, converted or otherwise adapted to one or more formats supported by mobile communication devices 104 by web server 126, but is instead transcoded, converted or otherwise adapted to one or more of such formats by synchronization server 116. If an MMSC is used, for example at messaging server 118, then optionally transcoding of the extracted data may be performed by the MMSC.

Figure 2:
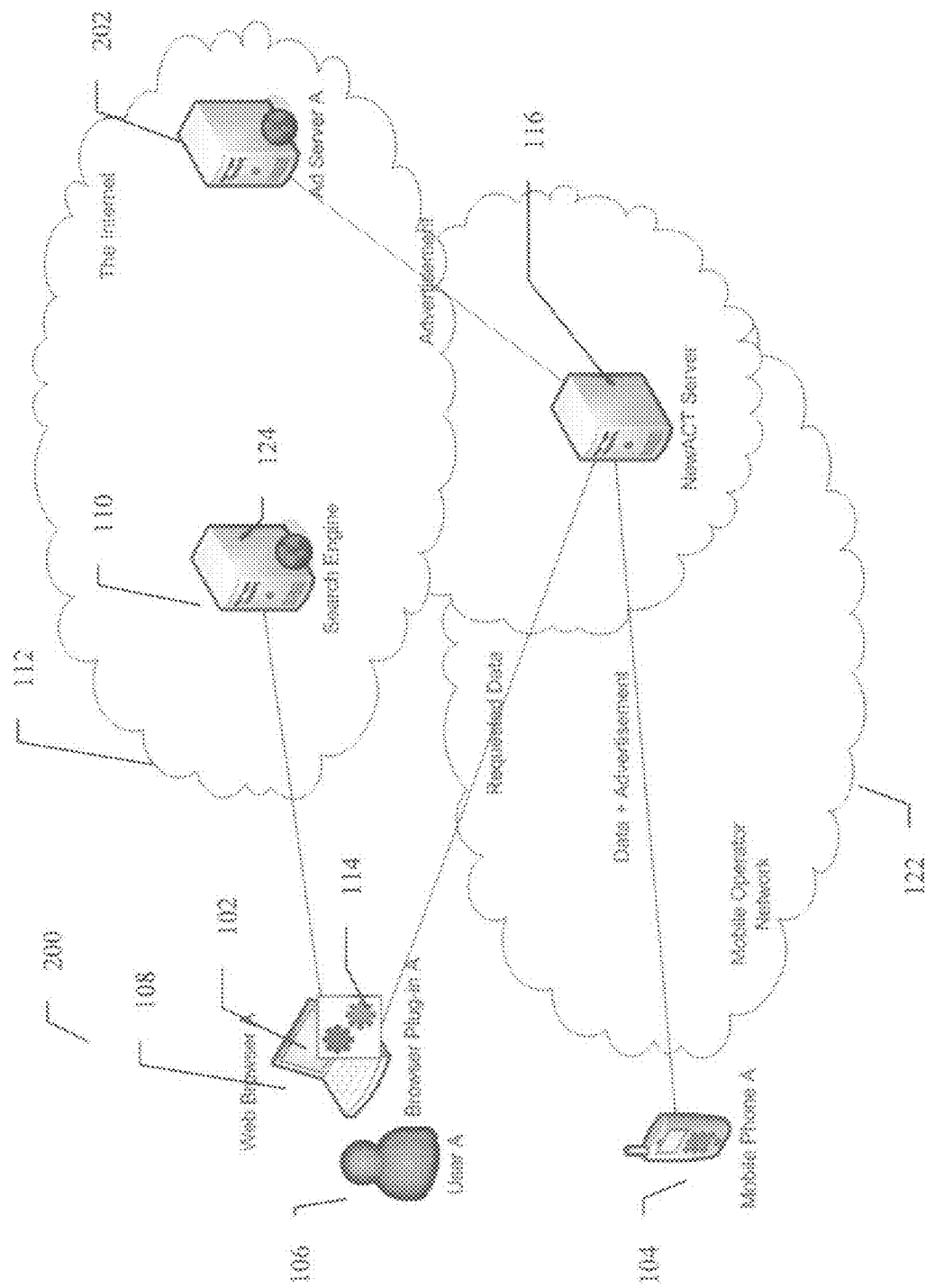
FIG. 2 is a schematic block diagram of another exemplary system according to the present invention for providing one or more advertisements.

FIG. 2 is a schematic block diagram of another exemplary system according to the present invention for providing one or more advertisements. Components with the same or similar function have the same reference numbers as for FIG. 1. A system 200, in addition to previously described components, now also preferably features an advertising server 202 (it should be noted that not all components are shown from FIG. 1, although they may optionally be incorporated within system 200). User 106A uses Web Browser 108A with browser plug-in 114A to search through computer network 112, shown herein as the Internet, using Search Engine 124. Once user 106A makes a request to update mobile communication device 104 as described above, advertising server 202 preferably adds an advertisement or promotion to the data sent to synchronization server 116. Synchronization server 116 in turns transmits the data, with the advertisement to mobile communication device 104 as described above, such that the advertisement is then displayed on mobile communication device 104.

FIG. 3 is a schematic block diagram of another exemplary system according to the present invention for operation with a mobile communication device featuring a web/WAP browser. Components with the same or similar function have the same reference numbers as for FIG. 1. A system 300, in addition to or in place of previously described components, now also preferably features a mobile communication device 302 that also has a web browser 304 (it should be noted that not all components are shown from FIG. 1, although they may optionally be incorporated within system 300). Web browser 304 preferably is not adapted for WAP, WML or other wireless application type mark-up language document formats (ie formats specially adapted for cellular telephones). Instead, web browser 304 preferably is able to display mark-up language documents as for the web browser of FIG. 1 (not shown), without special reformatting (as for example through a gateway adapted for such a purpose).

As shown with regard to FIG. 1, web browser 304 optionally and preferably communicates with search engine 124 and/or with web site server 126 preferably serves mark-up language documents such as web pages for example. As such documents are updated, optionally and preferably web site server 126 communicates automatically and directly with synchronization server 116 as previously described.

When user 106A browses Web Site A (through communication between web browser 304 and web site server 126), and requests that information be sent to mobile communication device 104, web site server 126 preferably notifies synchronization server 116 of the request. In turn, synchronization server 116 preferably determines whether relevant information exists for the specific site. If no information exists, and/or the information is not updated as of a predetermined date (for example, past day, past week, past month or any other time period), synchronization server 116 extracts the requested information from the web page or other mark-up language document, and/or receives the information from web site server 126. Synchronization server 116 preferably adapts the information to be received by mobile communication device 104 as previously described.

Optionally, this implementation of a system according to the present invention may be integrated with the Advertisement Server of FIG. 2 to add promotions and advertisements to the information sent to mobile communication device 104 (not shown).

While the invention has been described with respect to a limited number of embodiments, it will be appreciated that many variations, modifications and other applications of the invention may be made.

What is claimed is:

1. A method for selective data provision to a mobile communication device, comprising:
   receiving a selection of an item of data by a user through a user interface operated by a computer, wherein the computer is separate from a mobile communication device, and wherein the receiving the selection of the item of data comprises dividing the data into a plurality of categories;
   formatting the item of data for being received by the mobile communication device, wherein formatting the item of data further comprises:
      receiving at least one functional parameter of the mobile communication device, wherein the at least one functional parameter includes a model of the mobile communication device,
      mapping the model of the mobile communication device to a mobile communication device profile indicative of capabilities of the mobile communication device itself, such that:
         if a first mobile communication device model is determined, the first mobile communication device model is mapped to a first mobile communication device profile indicative of first mobile communication device capabilities of a first mobile communication device, and
         if a second mobile communication device model is determined, the second mobile communication device model is mapped to a second mobile communication device profile indicative of second mobile communication device capabilities of a second mobile communication device,
      formatting the item of data according to the at least one functional parameter that includes the model of the mobile communication device, such that:
         if the first mobile communication device model is determined, a first formatting of the item of data is utilized to accommodate the first mobile communication device capabilities of the first mobile communication device, and
         if the second mobile communication device model is determined, a second formatting of the item of data is utilized to accommodate the second mobile communication device capabilities of the second mobile communication device, and
      formatting data in the plurality of categories into different formats in a manner that is suitable for each of the plurality of categories, such that:
         if first data is determined to be of a first category of data, a third formatting of the first data is utilized, and
         if second data is determined to be of a second category of data, a fourth formatting of the second data is utilized and
   transmitting the item of data to the mobile communication device.

2. The method of claim 1, wherein the formatting the item of data is performed in real time upon the receiving the selection of the item of data.

3. The method of claim 1, wherein the at least one functional parameter includes at least one of text display, audio display, video display, and image display.

4. The method of claim 1, wherein the item of data is in a mark-up language format.

5. The method of claim 4, wherein the item of data comprises data from a web page.

6. The method of claim 4, wherein the mobile communication device does not comprise a web browser.

7. The method of claim 1, wherein the dividing the data is performed manually by the user.

8. The method of claim 1, wherein the dividing the data is performed automatically by the user interface.

9. The method of claim 1, wherein the dividing the item of data is performed automatically by a synchronization server, the synchronization server also formatting the item of data.

10. The method of claim 9, wherein the synchronization server communicates with the mobile communication device according to a synchronization protocol.

11. The method of claim 9, wherein the synchronization server communicates with the mobile communication device according to a messaging protocol.

12. The method of claim 1, wherein the item of data is provided by a remote computer and wherein the dividing the item of data is performed automatically by the remote computer.

13. The method of claim 1, wherein the mobile communication device comprises a cellular telephone.

14. The method of claim 13, wherein the user interface comprises a web browser and the item of data comprises data in a mark-up language format.

15. The method of claim 1, wherein the formatting further comprises adding an advertisement to the formatted item of data.

16. A method for selective data provision to a mobile communication device, comprising:
   formatting an item of data for being receivable by a mobile communication device, wherein formatting the item of data comprises:
      receiving at least one functional parameter of the mobile communication device, wherein the at least one functional parameter includes a model of the mobile communication device,
      mapping the model of the mobile communication device to a mobile communication device profile indicative of capabilities of the mobile communication device itself, such that:
         if a first mobile communication device model is determined, the first mobile communication device model is mapped to a first mobile communication device profile indicative of first mobile communication device capabilities of a first mobile communication device, and
         if a second mobile communication device model is determined, the second mobile communication device model is mapped to a second mobile communication device profile indicative of second mobile communication device capabilities of a second mobile communication device,
      formatting the item of data according to the at least one functional parameter that includes the model of the mobile communication device such that:
         if the first mobile communication device model is determined, a first formatting of the item of data is utilized to accommodate the first mobile communication device capabilities of the first mobile communication device, and
         if the second mobile communication device model is determined, a second formatting of the item of data is utilized to accommodate the second mobile communication device capabilities of the second mobile communication device,
      parsing the item of data to divide the data into a plurality of categories, and
      formatting data in the plurality of categories into different formats in a manner that is suitable for each of the plurality of categories, such that:
         if first data is determined to be of a first category of data, a third formatting of the first data is utilized, and
         if second data is determined to be of a second category of data, a fourth formatting of the second data is utilized;
   receiving a selection of the item of data by a user through a user interface operated by a computer, wherein the computer is separate from the mobile communication device and the computer does not communicate directly with the mobile communication device; and
   transmitting the item of data to the mobile communication device.

17. The method of claim 16, wherein the formatting the item of data further comprises formatting the item of data according to a plurality of different functional parameters to form a plurality of data formats;
   and wherein the transmitting the item of data comprises selecting one of the data formats according to the at least one received functional parameter of the mobile communication device.

18. The method of claim 16, wherein the at least one functional parameter includes at least one of text display, audio display, video display, and image display.

19. The method of claim 17, wherein the item of data is in a mark-up language format.

20. The method of claim 19, wherein the item of data comprises data from a web page.

21. The method of claim 16, wherein the parsing the item of data is performed automatically by the user interface.

22. The method of claim 16, wherein the parsing the item of data is performed automatically by a synchronization server, the synchronization server also formatting the item of data.

23. The method of claim 22, wherein the synchronization server communicates with the mobile communication device according to a synchronization protocol.

24. The method of claim 16, wherein the item of data is provided by a remote computer and wherein the parsing the item of data is performed automatically by the remote computer.

25. The method of claim 16, wherein the mobile communication device comprises a cellular telephone.

26. The method of claim 25, wherein the user interface comprises a web browser and the item of data comprises data in a mark-up language format.

27. The method of claim 16, wherein the transmitting the item of data further comprises adding an advertisement to the formatted item of data.

28. A system for selective data provision to a mobile communication device, comprising:
   a computer comprising a user interface for operation by a user;
   a web server for serving a document for display by the user interface; and a synchronization server for receiving an item of data from the web server, the item of data being selected by the user through the user interface and the receiving the item of data comprising dividing the data into a plurality of categories, and for formatting the item of data for a mobile communication device, wherein formatting the item of data further comprises:

receiving at least one functional parameter of the mobile communication device, wherein the at least one functional parameter includes a model of the mobile communication device, mapping the model of the mobile communication device to a mobile communication device profile indicative of capabilities of the mobile communication device itself, such that:
  if a first mobile communication device model is determined, the first mobile communication device model is mapped to a first mobile communication device profile indicative of first mobile communication device capabilities of a first mobile communication device, and
  if a second mobile communication device model is determined, the second mobile communication device model is mapped to a second mobile communication device profile indicative of second mobile communication device capabilities of a second mobile communication device, formatting, the item of data according to the at least one functional parameter that includes the model of the mobile communication device, such that:
  if the first mobile communication device model is determined, a first formatting of the item of data is utilized to accommodate the first mobile communication device capabilities of the first mobile communication device, and
  if the second mobile communication device model is determined, a second formatting of the item of data is utilized to accommodate the second mobile communication device capabilities of the second mobile communication device, and formatting data in the plurality of categories into different formats in a manner that is suitable for each of the plurality of categories, such that:
  if first data is determined to be of a first category of data, a third formatting of the first data is utilized, and
  if second data is determined to be of a second category of data, a fourth formatting of the second data is utilized.

29. A method for selective data provision to a mobile communication device, comprising:

receiving a selection of an item of data by a user through a user interface operated by a mobile communication device, wherein the receiving the selection of the item of data corn rises dividing the data into a plurality of categories;

formatting the item of data for being received by the mobile communication device, wherein the item of data is not received directly through the user interface, and wherein formatting the item of data further comprises:
  receiving at least one functional parameter of the mobile communication device, wherein the at least one functional parameter includes a model of the mobile communication device, mapping the model of the mobile communication device to a mobile communication device profile indicative of capabilities of the mobile communication device itself, such that:
    if a first mobile communication device model is determined, the first mobile communication device model is mapped to a first mobile communication device profile indicative of first mobile communication device capabilities of a first mobile communication device, and
    if a second mobile communication device model is determined, the second mobile communication device model is mapped to a second mobile communication device profile indicative of second mobile communication device capabilities of a second mobile communication device, formatting the item of data according to the at least one functional parameter that includes the model of the mobile communication device, such that:
    if the first mobile communication device model is determined, a first formatting of the item of data is utilized to accommodate the first mobile communication device ca abilities of the first mobile communication device, and
    if the second mobile communication device model is determined, a second formatting of the item of data is utilized to accommodate the second mobile communication device capabilities of the second mobile communication device, and formatting data in the plurality of categories into different formats in a manner that is suitable for each of the plurality of categories, such that:
    if first data is determined to be of a first category of data, a third formatting of the first data is utilized, and
    if second data is determined to be of a second category of data, a fourth formatting of the second data is utilized; and transmitting the item of data to the mobile communication device.

30. A synchronization server for providing formatted data to a mobile communication device from a remote computer, wherein the server is configured for:

receiving at least one functional parameter of a mobile communication device, wherein the at least one functional parameter includes a model of the mobile communication device;

receiving data from a remote computer, wherein the data is not formatted for the mobile communication device, and wherein receiving the data comprises dividing the data into a plurality of categories;

formatting the data according to the at least one functional parameter, wherein formatting the data further comprises:
  mapping the model of the mobile communication device to a mobile communication device profile indicative of capabilities of the mobile communication device itself, such that:
    if a first mobile communication device model is determined the first mobile communication device model is mapped to a first mobile communication device profile indicative of first mobile communication device capabilities of a first mobile communication device, and
    if a second mobile communication device model is determined, the second mobile communication device model is mapped to a second mobile communication device profile indicative of second mobile communication device capabilities of a second mobile communication device, formatting the data according to the at least one functional parameter that includes the model of the mobile communication device, such that:

if the first mobile communication device model is determined, a first formatting of the data is utilized to accommodate the first mobile communication device capabilities of the first mobile communication device, and if the second mobile communication device model is determined, a second formatting of the data is utilized to accommodate the second mobile communication device capabilities of the second mobile communication device, and formatting data in the plurality of categories into different formats in a manner that is suitable for each of the plurality of categories, such that:

if first data is determined to be of a first category of data, a third formatting of the first data is utilized, and if second data is determined to be of a second category of data, a fourth formatting of the second data is utilized; and transmitting the data to the mobile communication device.

31. The method of claim 1, wherein the model of the mobile communication device provides an indication of software capabilities of the mobile communication device including at least one content type and at least one media format that are supported by the mobile communication device.

32. The method of claim 1, wherein the model of the mobile communication device provides an indication of software capabilities of the mobile communication device including a calendar feature, a notes function, and a multimedia messaging service feature.

33. The method of claim 1, wherein the first category of data includes telephone number data.

34. The method of claim 1, wherein the first category of data includes business contact data.

35. The method of claim 1, wherein the model of the mobile communication device is received as a User-Agent string.

* * * * *

UNITED STATES PATENT AND TRADEMARK OFFICE
CERTIFICATE OF CORRECTION

PATENT NO. : 8,031,694 B2  
APPLICATION NO. : 12/068573  
DATED : October 4, 2011  
INVENTOR(S) : Gidron et al.

Page 1 of 1

It is certified that error appears in the above-identified patent and that said Letters Patent is hereby corrected as shown below:

In the claims:
- Claim 1, col. 10, line 65; please replace "utilized" with --utilized;--;
- Claim 16, col. 11, line 65; please replace "device" with --device,--;
- Claim 28, col. 13, line 28; please replace "formatting," with --formatting--;
- Claim 29, col. 13, line 55; please replace "corn rises" with --comprises--;
- Claim 29, col. 14, line 23; please replace "ca abilities" with --capabilities--;
- Claim 30, col. 14, lines 59-60; please replace "determined" with --determined,--.

Signed and Sealed this  
Nineteenth Day of February, 2013

Teresa Stanek Rea  
*Acting Director of the United States Patent and Trademark Office*